Patented Feb. 26, 1924.

1,485,021

UNITED STATES PATENT OFFICE.

MAX ENGELMANN, OF WILMINGTON, DELAWARE, ASSIGNOR TO E. I. DU PONT DE NEMOURS & COMPANY, OF WILMINGTON, DELAWARE, A CORPORATION OF DELAWARE.

PROCESS OF DISINFECTING SEEDS AND COMPOSITION THEREFOR.

No Drawing.   Application filed October 10, 1921. Serial No. 506,790.

*To all whom it may concern:*

Be it known that I, MAX ENGELMANN, a citizen of Germany, and a resident of Wilmington, in the county of New Castle and State of Delaware, U. S. A., have invented a certain new and useful Process of Disinfecting Seeds and Composition Therefor, of which the following is a specification.

This invention relates to a process of disinfecting seeds against parasites, and to a new composition for effecting this disinfection. The new process comprises treating the seeds to be disinfected with a solution of a basic-nitrogen derivative of an organic acid having a mercury atom attached directly to the nitrogen atom. My new composition comprises a water solution of the above-defined mercury derivative, which solution preferably also contains a substance having a distinct alkaline reaction as, for example, the hydroxides, carbonates, or bicarbonates of sodium or potassium, calcium hydroxide, etc.

The parasites which cause diseases of the growing seed of cereals or the fruits of other plants are all kinds of smuts, fasarium, glocosporium, etc. The plants whose seeds may be advantageously disinfected by my process are, for example, wheat, oats, potatoes, beans, peas, barley, cabbage, and maize.

The process may be carried out by steeping the seeds for a period of from about one to three hours, in the solution of the mercury compound at normal room temperature, or by applying to the seeds just enough of the solution to wet them, and then turning the seeds over by hand or agitating them mechanically to bring about uniform distribution of the solution throughout the mass of seeds.

The mercury compounds which, according to my discovery, have the valuable property of killing the parasites which cause diseases of seeds include (1) the mercury derivatives of acylamids having the general formula:

I.   $(R-CO.NH.)_2Hg$ where R represents hydrogen, alkyl or other univalent organic radical, for example mercury asetamide, mercury oleylamide, mercury benzamide, etc.; (2) the mercury derivatives of acylimids having the general formula:—

II.   $(R_1{<}^{-CO}_{-CO}{>}N.)_2Hg$ where $R_1$ represents a divalent organic radical, for example the mercury derivative of succinimide, phthalimide, etc; and (3) the mercury derivatives of amino-acids having the general formula:

III.   $Hg(.NH.R_2-COOH)_2$ where $R_2$ stands for a divalent organic radical, for example the mercury compound of aminoacetic acid, amino-butyric acid, etc.

The above mentioned mercury compounds may be designated generically as mercury derivatives of organic compounds having an acyl group and a NH: group, the mercury being attached directly to the N-atoms of two organic radicals which are unconnected except through the mercury atom.

The aqueous disinfecting solution should, ordinarily, contain less than 3% by weight, and preferably between 0.05% and 1% of the mercury compound.

The beneficial effect of the disinfecting solution is augmented by the presence of substances, hereinbefore mentioned, having an alkaline reaction, the function of these substances being to neutralize the acid which ordinarily exists in seeds. The proportion of sodium carbonate or other alkaline-reacting substance which may be used in the solution will of course vary with the kind of seed being treated, but may ordinarily be between 1% and 100% of the weight of the mercury compound in the solution.

A typical solution which can be used to advantage in disinfecting seeds consists of water containing in solution .2% of mercury acetamide, i. e. $(CH_3.CO.NH.)_2Hg$, and 0.1% of caustic soda.

After being treated for the required length of time with the solution of the mercury compound, the seeds are dried, the mercury compound being left on the seeds.

I claim:

1. The process of disinfecting seeds which comprises subjecting the seed to the action of a solution of an organic compound of mercury containing a basis nitrogen atom, the mercury being attached directly to said nitrogen atom.

2. The process of disinfecting seeds which comprises subjecting the seed to the action of a solution of a mercury derivative of an organic compound having an acyl group and an NH: group, the mercury being attached directly to the N-atom.

3. The process of disinfecting seeds which comprises subjecting the seed to the action of a solution of a mercury derivative of an organic compound having an acyl group and an NH: group, the mercury being attached directly to the N-atom, said solution containing also an alkaline-reacting substance.

4. The process of disinfecting seeds which comprises subjecting the seed to the action of a solution of a mercury derivative of an organic compound having an acyl group and an NH: group, the mercury being attached directly to the N-atom, said solution containing also from about 1% to 100% of the hydroxide, carbonate, or bicarbonate of an alkali-metal based upon the weight of the mercury compound present.

5. The process of disinfecting seeds which comprises subjecting the seed to the action of a solution comprising mercury-acetamide dissolved in water.

6. The process of disinfecting seeds which comprises subjecting the seed to the action of a solution comprising from about 0.05 to 1 part of mercury-acetamide dissolved in 100 parts of water.

7. The process of disinfecting seeds which comprises subjecting the seed to the action of a solution comprising mercury-acetamide and an alkaline-reacting substance dissolved in water.

8. The process of disinfecting seeds which comprises subjecting the seed to the action of an aqueous solution of a mercury compound of an acylamide, said compound having the following general formula:

$$(R-CO.NH.)_2Hg$$

where R represents hydrogen, alkyl, or other univalent organic radical.

9. A composition for disinfecting seeds comprising a water solution containing an appreciable proportion, but less than 3%, of a mercury derivative of an organic compound containing an acyl group and an NH: group, the mercury being attached directly to the N-atoms of two organic radicals which are unconnected except through the mercury atom.

10. A composition for disinfecting seeds comprising a water solution containing an alkaline-reacting substance and a mercury derivative of an organic compound containing an acyl group and an NH: group, the mercury being attached directly to the N-atoms of two organic radicals which are unconnected except through the mercury atom.

11. A composition for disinfecting seeds comprising a water solution containing an appreciable proportion, but less than 3%, of a mercury compound of an acylamide having the following general formula:

$$(R-CO.NH.)_2Hg$$

where R represents hydrogen, alkyl, or other univalent organic radical.

12. A composition for disinfecting seeds comprising a water solution containing an alkaline-reacting substance and a mercury compound of an acylamide having the following general formula:

$$(R-CO.NH.)_2Hg$$

where R represents hydrogen, alkyl, or other univalent organic radical.

13. A composition for disinfecting seeds comprising a water solution containing from about 0.05% to 1% of a mercury derivative of an organic compound containing an acyl group and an NH: group, the mercury being attached directly to the N-atoms of two organic radicals which are unconnected except through the mercury atom.

14. A composition for disinfecting seeds comprising a water solution containing an alkaline-reacting substance and from about 0.05% to 1% of a mercury derivative of an organic compound containing an acyl group and an NH: group, the mercury being attached directly to the N-atoms of two organic radicals which are unconnected except through the mercury atom.

15. A composition for disinfecting seeds comprising a water solution containing from about 0.05% to 1% of a mercury derivative of an acylamide having the general formula:

$$(R-CO.NH.)_2Hg$$

where R represents hydrogen, alkyl, or other univalent organic radical.

16. A composition for disinfecting seeds comprising a water solution containing an alkali and from about 0.05% to 1% of a mercury derivative of an acylamide having the general formula:

$$(R-CO.NH.)_2Hg$$

where R represents hydrogen, alkyl, or other univalent organic radical.

17. A composition for disinfecting seeds comprising a water solution containing from about 0.05% to 1% of a mercury derivative of acetamide.

18. A composition for disinfecting seeds comprising a water solution containing an alkali and from about 0.05% to 1% of a mercury derivative of acetamide.

In testimony whereof I affix my signature.

MAX ENGELMANN.